US010475171B2

(12) United States Patent
Mrdjen et al.

(10) Patent No.: US 10,475,171 B2
(45) Date of Patent: Nov. 12, 2019

(54) MULTI-CAMERA IMAGING SYSTEM FOR NANOSATELLITES

(71) Applicant: Hera Systems, Inc., San Jose, CA (US)

(72) Inventors: Peter Mrdjen, Aptos, CA (US); David D. Squires, Stockton, CA (US); Robert Machinski, Campbell, CA (US); Jolyon D. Thurgood, San Francisco, CA (US); Brij Agrawal, Monterey, CA (US); Greg Defouw, Redwood City, CA (US); Jeffrey Wedmore, San Jose, CA (US)

(73) Assignee: Hera Systems, Inc., San Jose, CA (US)

( * ) Notice: Subject to any disclaimer, the term of this patent is extended or adjusted under 35 U.S.C. 154(b) by 0 days.

(21) Appl. No.: 15/413,409

(22) Filed: Jan. 23, 2017

(65) Prior Publication Data

US 2017/0352139 A1 Dec. 7, 2017

Related U.S. Application Data

(60) Provisional application No. 62/286,225, filed on Jan. 22, 2016.

(51) Int. Cl.
*H04N 5/33* (2006.01)
*G06T 5/50* (2006.01)
(Continued)

(52) U.S. Cl.
CPC ............... *G06T 5/50* (2013.01); *G02B 23/04* (2013.01); *G02B 27/1013* (2013.01); *G02B 27/141* (2013.01); *G06T 5/002* (2013.01); *H04N 5/2252* (2013.01); *H04N 5/2254* (2013.01); *H04N 5/2258* (2013.01); *H04N 5/23229* (2013.01); *H04N 5/23296* (2013.01); *H04N 5/247* (2013.01); *H04N 5/332* (2013.01); *H04N 9/045* (2013.01); *H04N 9/07* (2013.01);
(Continued)

(58) Field of Classification Search
CPC ........... G06T 5/50; H04N 5/247; H04N 5/232
USPC ......................................... 348/144
See application file for complete search history.

(56) References Cited

U.S. PATENT DOCUMENTS

2002/0041328 A1\* 4/2002 LeCompte ........... G01C 11/025
348/144
2004/0119020 A1\* 6/2004 Bodkin ..................... G01J 3/02
250/353
(Continued)

OTHER PUBLICATIONS

International Search Report and Written Opinion dated May 26, 2017, International Patent Application No. PCT/US2017/014636, filed Jan. 23, 2017.

*Primary Examiner* — Nguyen T Truong
(74) *Attorney, Agent, or Firm* — Davis Wright Tremaine LLP; Philip H. Albert

(57) ABSTRACT

A satellite imaging system uses multiple cameras. For example, the incoming light from a telescope section of the satellite goes through a dichroic beam splitter, with the standard visible spectrum going to a first camera and wavelengths outside of the standard visible spectrum, such as in the infrared or coastal blue range, are sent to a second camera, allowing image data from multiple wavelength ranges to be captured simultaneously. The image data from the different wavelengths of the two cameras can then be selectively recombined. In a more general case, there is a first range of wavelengths and a second range of wavelengths.

11 Claims, 13 Drawing Sheets

(51) Int. Cl.
  *H04N 5/247* (2006.01)
  *H04N 9/07* (2006.01)
  *H04N 5/232* (2006.01)
  *G06T 5/00* (2006.01)
  *G02B 27/10* (2006.01)
  *G02B 23/04* (2006.01)
  *G02B 27/14* (2006.01)
  *H04N 5/225* (2006.01)
  *H04N 9/04* (2006.01)
  *H04N 9/09* (2006.01)

(52) U.S. Cl.
  CPC ..... *H04N 9/09* (2013.01); *G06T 2207/10036* (2013.01); *G06T 2207/10041* (2013.01); *G06T 2207/10048* (2013.01); *G06T 2207/20221* (2013.01); *G06T 2207/30181* (2013.01)

(56) References Cited

U.S. PATENT DOCUMENTS

| | | |
|---|---|---|
| 2009/0015891 A1 | 1/2009 | Kane |
| 2010/0053609 A1 | 3/2010 | Chrisp |
| 2011/0193814 A1 | 8/2011 | Gay et al. |
| 2011/0292505 A1 | 12/2011 | Kurtz et al. |
| 2013/0155218 A1 | 6/2013 | Kalkbrenner et al. |
| 2013/0223832 A1 | 8/2013 | Miesak |
| 2014/0195150 A1 | 7/2014 | Rios |
| 2015/0326769 A1 | 11/2015 | Richarte et al. |

\* cited by examiner

| Band | Wavelength |
|---|---|
| Coastal Blue | 400-450 nm |
| Blue | 450-510 nm |
| Green | 510-580 nm |
| Yellow | 585-625 nm |
| Red | 630-690 nm |
| Red Edge | 705-745 nm |
| NIR-1 | 770-895 nm |
| NIR-2 | 860-1040 nm |

FIG. 12

Camera 1

| R | Y | R | Y |
|---|---|---|---|
| G | B | G | B |
| R | Y | R | Y |
| G | B | G | B |

Camera 2

| CB | RE | CB | RE |
|---|---|---|---|
| N1 | N2 | N1 | N2 |
| CB | RE | CB | RE |
| N1 | N2 | N1 | N2 |

FIG. 13

MULTI-CAMERA IMAGING SYSTEM FOR NANOSATELLITES

CROSS-REFERENCES TO PRIORITY AND RELATED APPLICATIONS

This application claims priority from and is a non-provisional of U.S. Provisional Patent Application No. 62/286,225 filed Jan. 22, 2016 entitled "Multi-Camera Imaging System for Nanosatellites."

Related applications include:

U.S. Provisional Patent Application No. 62/286,234 filed Jan. 22, 2016 entitled "Imaging System with an Optical Path and Telescope Shape Optimized for Nanosatellites" naming Squires et al. ("Squires I").

U.S. Provisional Patent Application No. 62/286,229 filed Jan. 22, 2016 entitled "Image Stabilization and Pixel Shifting for a Nanosatellite Imaging System" naming Squires et al. ("Squires II").

U.S. patent application Ser. No. 15/413,406 filed Jan. 23, 2017 entitled "Imaging System with an Optical Path and Telescope Shape Optimized for Nanosatellites". [Filed of even date with the present application.]

U.S. patent application Ser. No. 15/413,413 filed Jan. 23, 2017 entitled "Image Stabilization and Pixel Shifting for a Nanosatellite Imaging System". [Filed of even date with the present application.]

FIELD OF THE INVENTION

The present disclosure generally relates to satellite-based imaging systems and more generally to satellites for capturing high-resolution images.

The entire disclosure(s) of application(s)/patent(s) recited above is(are) hereby incorporated by reference, as if set forth in full in this document, for all purposes.

All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BACKGROUND

The costs to launch a rocket into Earth orbit can run into the millions of dollars. As a rocket can carry multiple satellites and other equipment, the cost of the launch can be allocated among the different payloads. Consequently, smaller satellites might incur smaller costs to get into orbit. The measure of a size of a satellite could relate to its mass, its volume, its height, width and depth, as well as its shape. As for shape, it might be that the cost of getting equipment onto a launch bay is a function of the envelope of the satellite.

In view of these considerations, nanosatellites are often deployed, especially where the desired functionality fits in a nanosatellite form factor and where a constellation of satellites are needed. The term "nanosatellite" often refers to an artificial satellite with a wet mass between 1 and 10 kg, but it should be understood that features might be present in satellites outside that range. A constellation of smaller satellites might be more useful than one large satellite for the same or similar construction and launch budget. However, the result is usually that a rocket payload comprises many more independent vehicles.

To accommodate a large number of independent satellites, rocket logistics often dictate that the satellites be rectangular prisms or other shapes that are space-filling. For example, some nanosatellites are generally cube shaped. Typically these satellites include propulsion, solar panels for on-board electrical power generation, and communications capabilities. Some satellites are used for imaging and might include a telescope assembly for light gathering and a camera assembly for converting gathered light into electronic data, which can then be processed on-board and/or communicated to another satellite or a ground station.

For a celestial imaging system that has missions to capture images of the Sun, the Moon, starts and other astronomical objects, the particular orbit might not matter. However, for Earth-observing satellites, closer is better. Of course, there are limits to how low an orbit can be and still be viable. As a result, such a satellite is performing as a terrestrial long distance imaging system, and has a number of challenges. One is the distance between the satellite and the target of an imaging process. Another is that the satellite is not anchored, so internal movements can cause rotations of the satellite. Also, the satellite is moving at a high speed in order to maintain its orbit, which means the satellite is not stationary with respect to the target. The terrestrial long distance imaging system has to also deal with the conditions of operating in space and the stress of launch.

For imaging purposes, a satellite might have to address significant size and operational constraints, such as the resolution of images and spectra covered. The light available to a satellite might be limited by the amount of time available for image capture. Consequently, there are a number of areas in which satellite imaging systems can benefit from improvement

SUMMARY

A satellite imaging system used in a satellite has a telescope section arranged to receive incoming light along an optical path, a first camera having a first sensor array positioned in the optical path and sensitive to a first set wavelength ranges including one or more wavelength ranges within a visible spectrum, a second camera having a second sensor array positioned in the optical path and sensitive to a second set wavelength ranges including one or more wavelength ranges outside the visible spectrum, and a dichroic beam splitter in the optical path, where light in the first set wavelength ranges is directed to the first camera and light in the second set wavelength ranges is directed to the second camera.

The dichroic beam splitter might be a whole-spectrum beam splitter, where either the first sensor array or the second sensor array is a panchromatic sensor array, and the other sensor array (second or first array) is a non-panchromatic sensor array providing pixelated, color-filtered images, and where outputs of the panchromatic sensor array are usable to enhance the pixelated, color-filtered images. The satellite imaging system might include electronic bandwidth controls for controlling and/or modifying a passband defined by the dichroic beam splitter where the first set wavelength ranges and/or the second set wavelength ranges wavelengths can be controlled and/or modified. A third camera and a second beam splitter might be provided in the optical path, where at least a portion of the incoming light is directed to the third camera. Electronic field of view controls might be used for controlling and/or modifying a telescope field of view.

Various aspects, advantages, features and embodiments are included in the following description of exemplary examples thereof, which description should be taken in conjunction with the accompanying drawings. The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 12 is a chart of spectral bands.

FIG. 13 illustrates examples of color filters used on pixel arrays.

DETAILED DESCRIPTION

Figure 1:
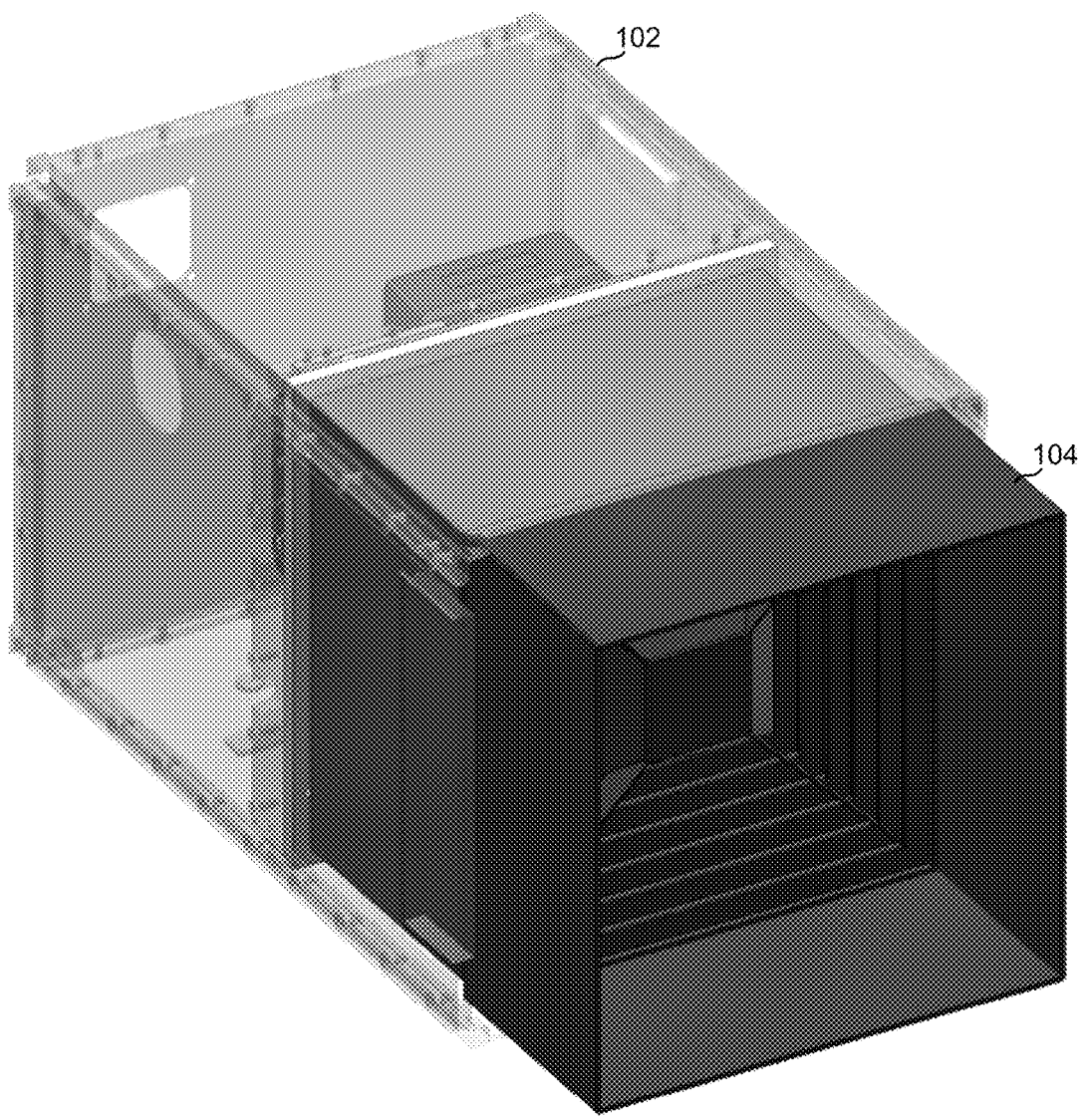
FIG. 1 is a front isometric view of an imaging nanosatellite.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include an imaging satellite having an imaging system that provides for separate cameras, such as separate lensing, separate filtering, and separate sensor arrays, possibly also including processing logic to combine outputs of the separate sensor arrays in various manners to improve over what could be done with a single sensor array.

A camera might be formed of a set of zero or more focusing elements, a set of zero or more light deflection elements, a set of zero or more filtering elements, and a sensor array that captures incident light. The sensor array might comprise a plurality of light sensitive pixels in a two-dimensional array (2D) of pixels. The individual pixel sensors might be charge coupled devices (CCDs), complementary metal-oxide semiconductor (CMOS) type, microbolometer arrays, or other sensor elements. A sensor array might have all of its pixels sensitive to the same range of light wavelengths, or it might have a varying pattern of sensitivities over the array. For example, for a sensor array using an RGBY colorspace for the visual spectrum, the array will need to accommodate sensors for each of the red, green, blue, and yellow color wavelength ranges, which will reduce the resolution of the each wavelength range by half (doubling the size of the smallest detectable object in green light). If additional wavelength ranges are to be sensed with the same array, such as into the infrared or the ultra-violet, this will further reduce the resolution of the individual wavelength ranges.

In an example satellite imaging system, multiple cameras are used, such as where incoming light from a telescope section of a satellite may go through a dichroic beam splitter, with the standard visible spectrum going to a first camera and wavelengths outside of the standard visible spectrum, such as in the infrared or coastal blue range, being sent to a second camera, allowing image data from multiple wavelength ranges to be captured simultaneously. The image data from the different wavelengths of two (or more) cameras can then be selectively recombined. In a more general case, there is a first range of wavelengths and a second range of wavelengths.

As adding additional cameras and sensors to detect individual wavelength bands can cause an undesirable increase in the weight of a satellite, the balancing of weight against utilization of wavelength bands (also known as spectral resolution) is an important concern for a satellite imaging system. The satellite imaging system described herein performs this balancing by using multiple cameras having sensor arrays sensitive to different wavelength ranges, in order to improve the spectral resolution of the multi-camera system, and make use of the full sensitive spectrum of the sensors so the individual cameras can each be sensitive to more than one wavelength range, in order to save on the mass of the satellite while utilizing the full available spectrum of light and provide other benefits.

For example, the incoming image can be exposed to at least two cameras, with each of the cameras getting a distinct set of one or more wavelength bands which can be sensed in one or more narrower filtered wavelength band that can be captured simultaneously. The images of the selected wavelength ranges from each of the cameras are then aligned and combined to form a remerged image having color components from more than one of the cameras. Depending on the embodiment, the selection and combination of wavelength ranges from the different cameras can be done on the satellite, done terrestrially, or some combination of these.

The incoming image can be split using a double-dichroic beam splitter. In one embodiment, there are two cameras with the first camera receiving the visible light wavelengths, while the second camera gets the red edge (RE), Near Infrared 1 (N1) and Near Infrared 2 (N2), and possibly also wavelengths below the range of standard visible wavelength sensors, such as Coastal Blue (CB). Use of one camera for the visible range can have the advantage that data from the visible range is commonly wanted in applications and that such sensors are more readily available. This also allows for use of differing resolution levels, if desired, where the visible image can have a higher resolution that can be overlaid with data from selected ones of the additional wavelengths that are of interest for a particular application. In general, using a dichroic beam splitter, available light from a light path can be partitioned into two (or more)

separate subpaths for use by camera sensors with different spectral sensitivities. While a given sensor array might not be sensitive to a particular range of wavelengths, the light in that range of wavelengths is not wasted, as it can be directed to a different sensor array that is sensitive to it.

Some implementations of this design will make it is possible to include cameras with shortwave infrared (SWIR) and longwave infrared (LWIR) sensors. Sensors in these wavelength bands make it possible to collect mineralogical and thermal images and see through smoke and cloud cover. Other implementations can combine hyperspectral imagers in these wavebands with a visible waveband imager.

Figure 2:
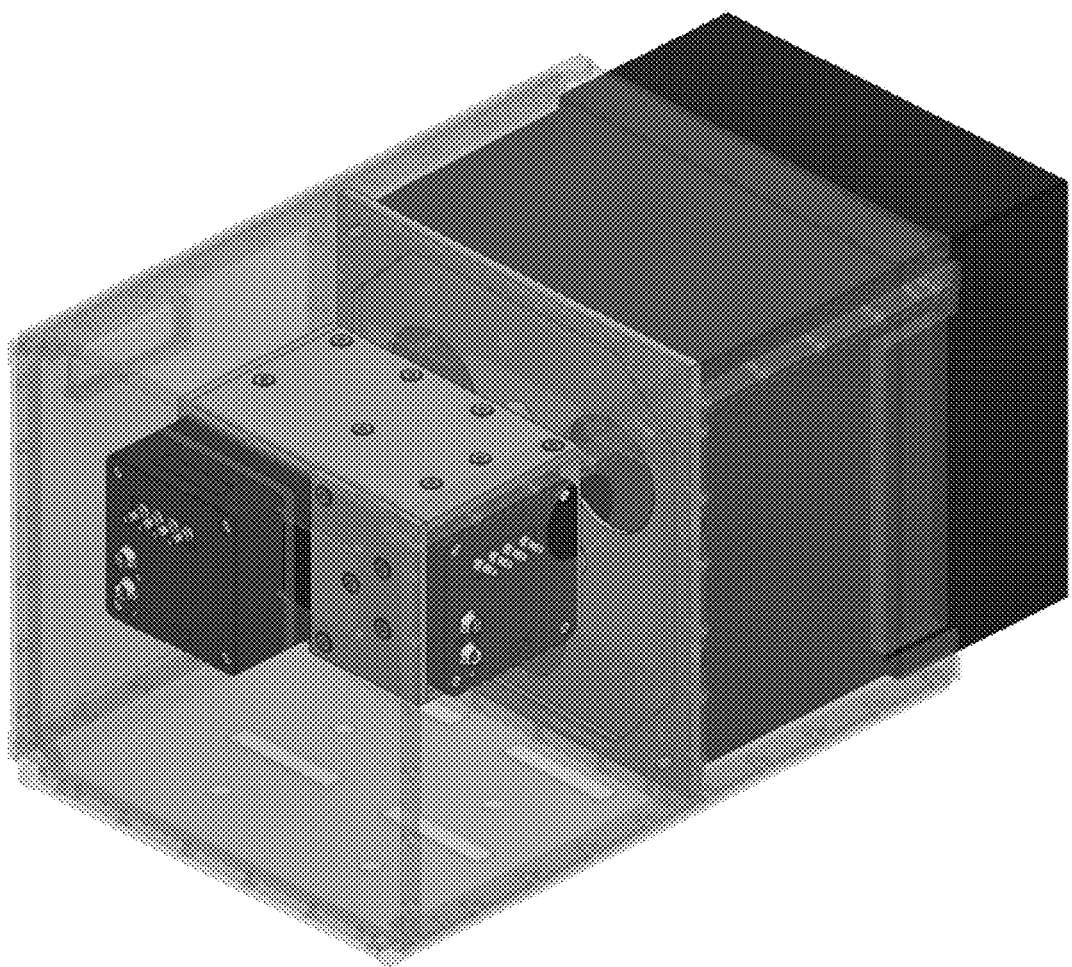
FIG. 2 is a rear isometric view of an imaging nanosatellite.

FIG. 1 is a front isometric view for an example of an imaging system of a satellite in a nanosatellite form factor. In this example, the satellite is a rectangular box shape, with a square cross-section, that allows a number of such satellites to be stacked compactly as the payload of a launch vehicle. To optimize the optical path to this particular satellite cross-section, the first mirror and other optical elements of the telescope sections can use a square shape, but the camera arrangement described here is not restricted to such an arrangement of the telescope section. The satellite is shown with a deployable fore-baffle extended to aid with stray light control, but that can be retracted to keep the satellite compact. Shown at the rear is the camera system, which is partially visible in the view of FIG. 1. The camera system is more visible in the rear isometric view of FIG. 2. A dual camera system with a double-dichroic beam splitter in the optical pathway is shown.

Figure 3:
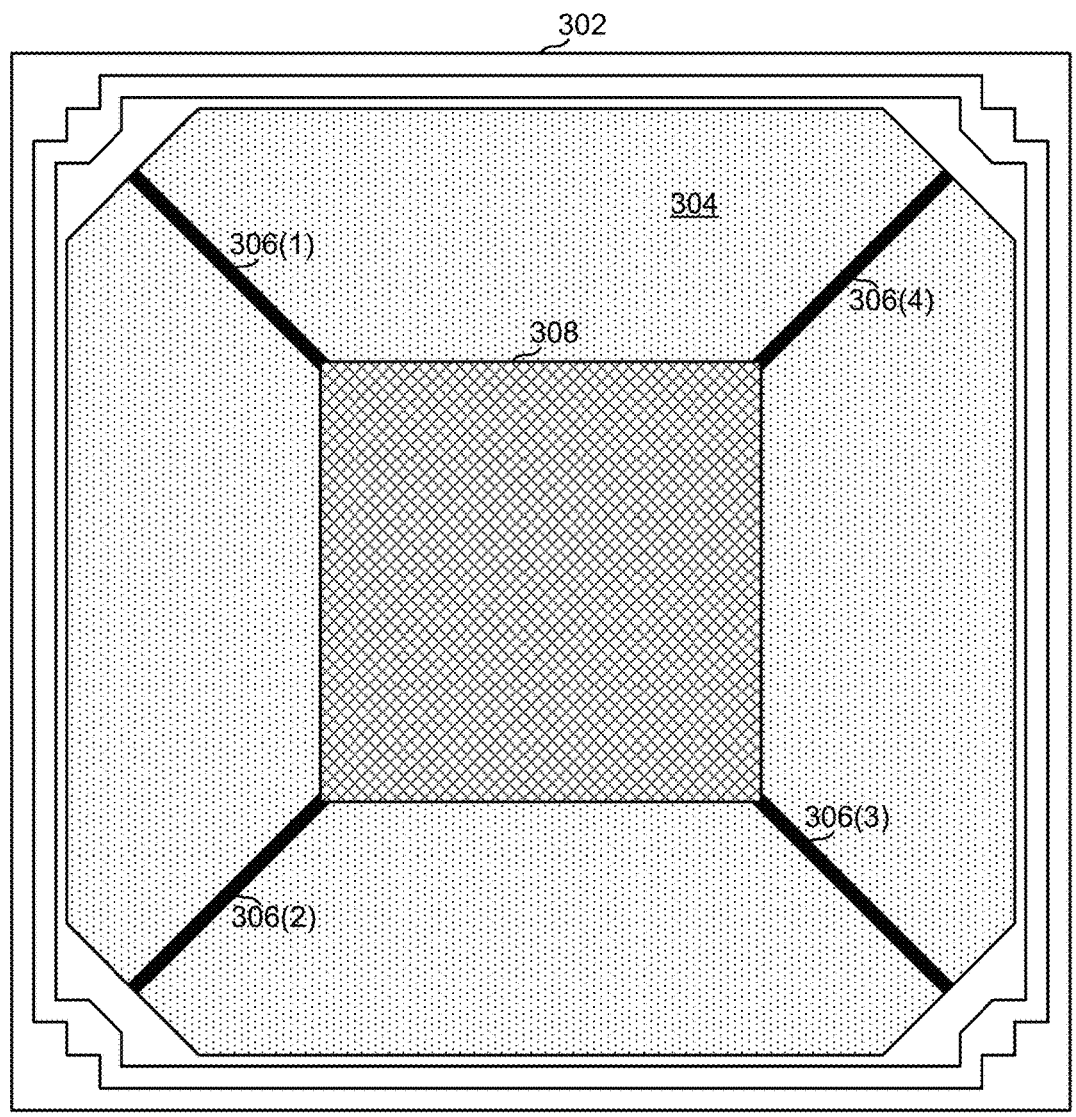
FIG. 3 is a front planar view of a telescope section of an imaging nanosatellite.

FIG. 3 is a front planar view of a telescope section of an imaging system of a satellite 302. FIG. 3 shows a primary reflector 304, a secondary reflector 308 and struts 306(1)-(4) for supporting secondary reflector 308. Struts 306 can be attached to satellite 302 in the plane of secondary reflector 308 and/or attached more to the rear, such as further back on or through primary reflector 304.

Figure 4:
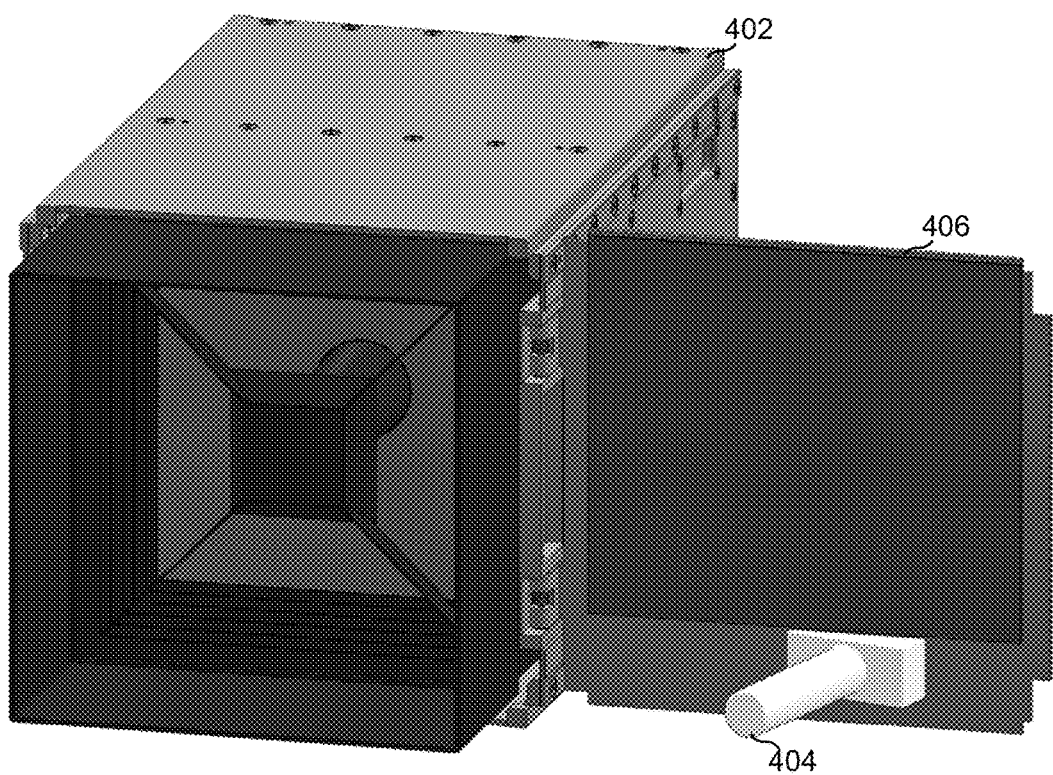
FIG. 4 is an isometric view of an imaging nanosatellite in a deployed mode with communications antennas deployed.

FIG. 4 is an isometric view of an imaging nanosatellite 402 in a deployed mode with communications antennas deployed. In this example, there is a planar antenna 406 and another antenna 404.

Figure 5:
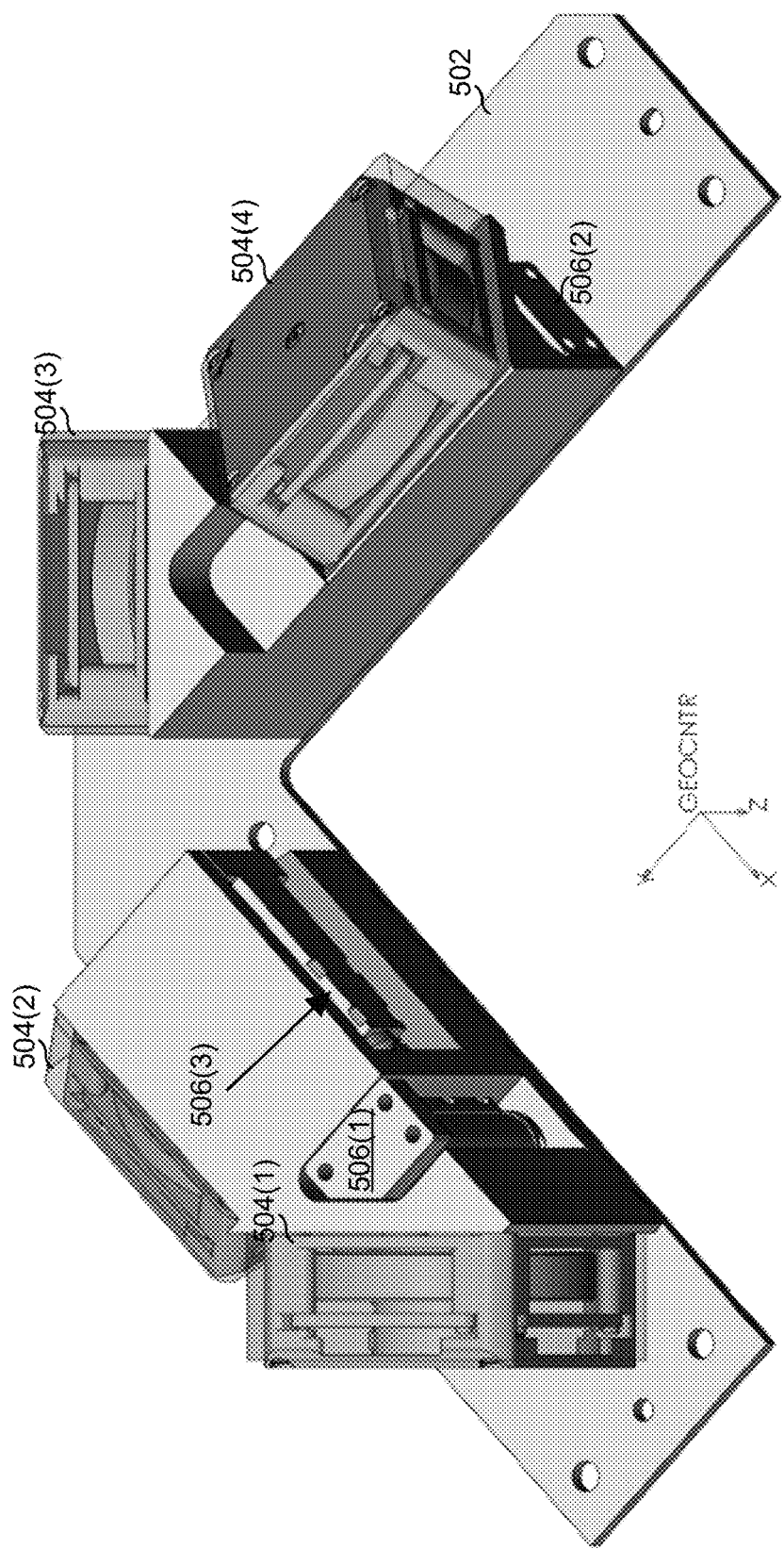
FIG. 5 is an illustration of a rotation control assembly.

FIG. 5 is an illustration of a rotation control assembly 502 including reaction wheels 504(1)-(4) and torque rods 506(1)-(3).

Figure 6:
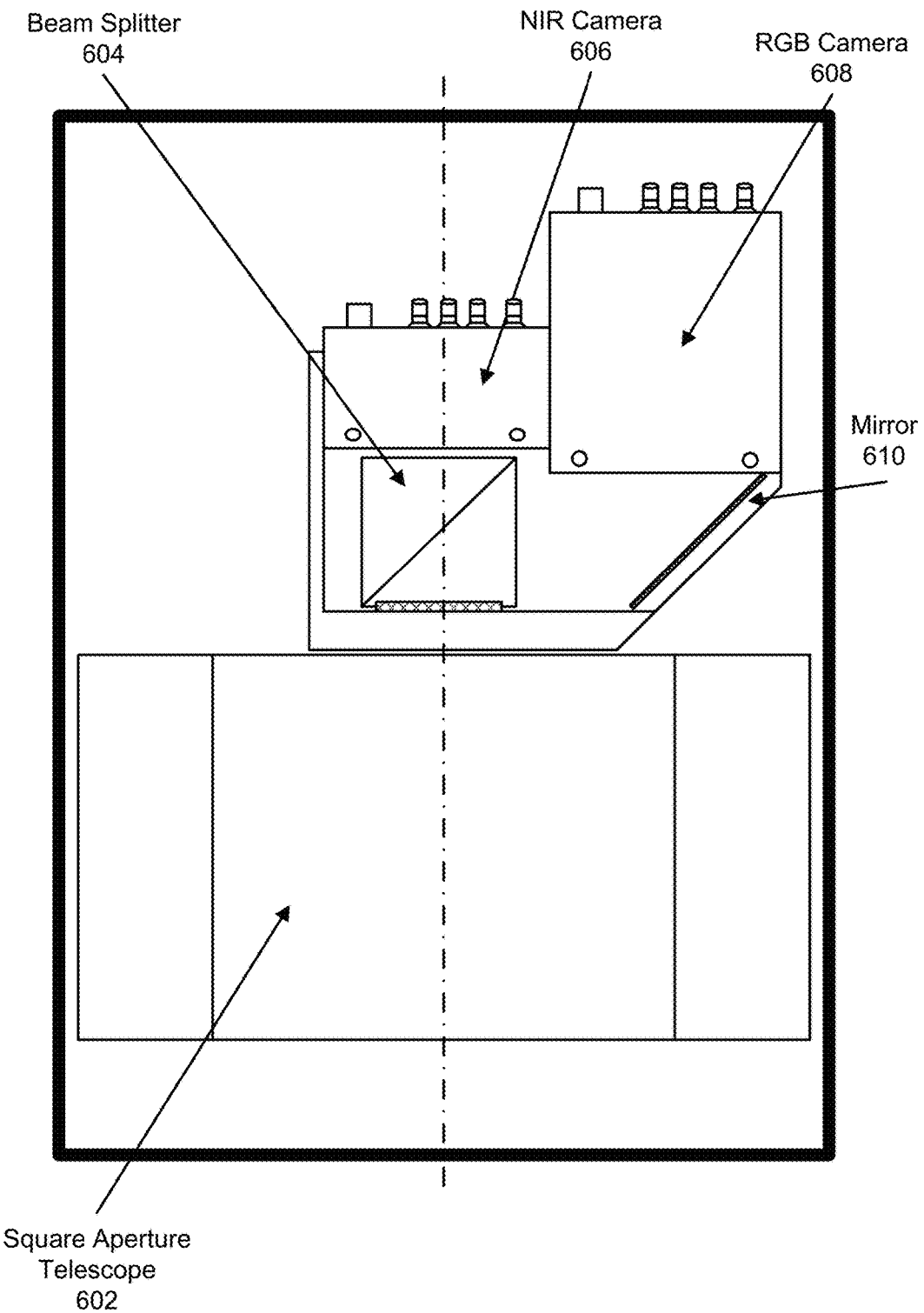
FIG. 6 is an illustration of an example imaging system with arrangement of multiple cameras and a square aperture telescope section.

FIG. 6 is an illustration of an example dual-camera imaging system with arrangement of multiple cameras and a square aperture telescope section. The imaging system includes a square aperture telescope section 602, a beam splitter 604, a mirror 610, a first camera 608 and a second camera 606.

Figure 7:
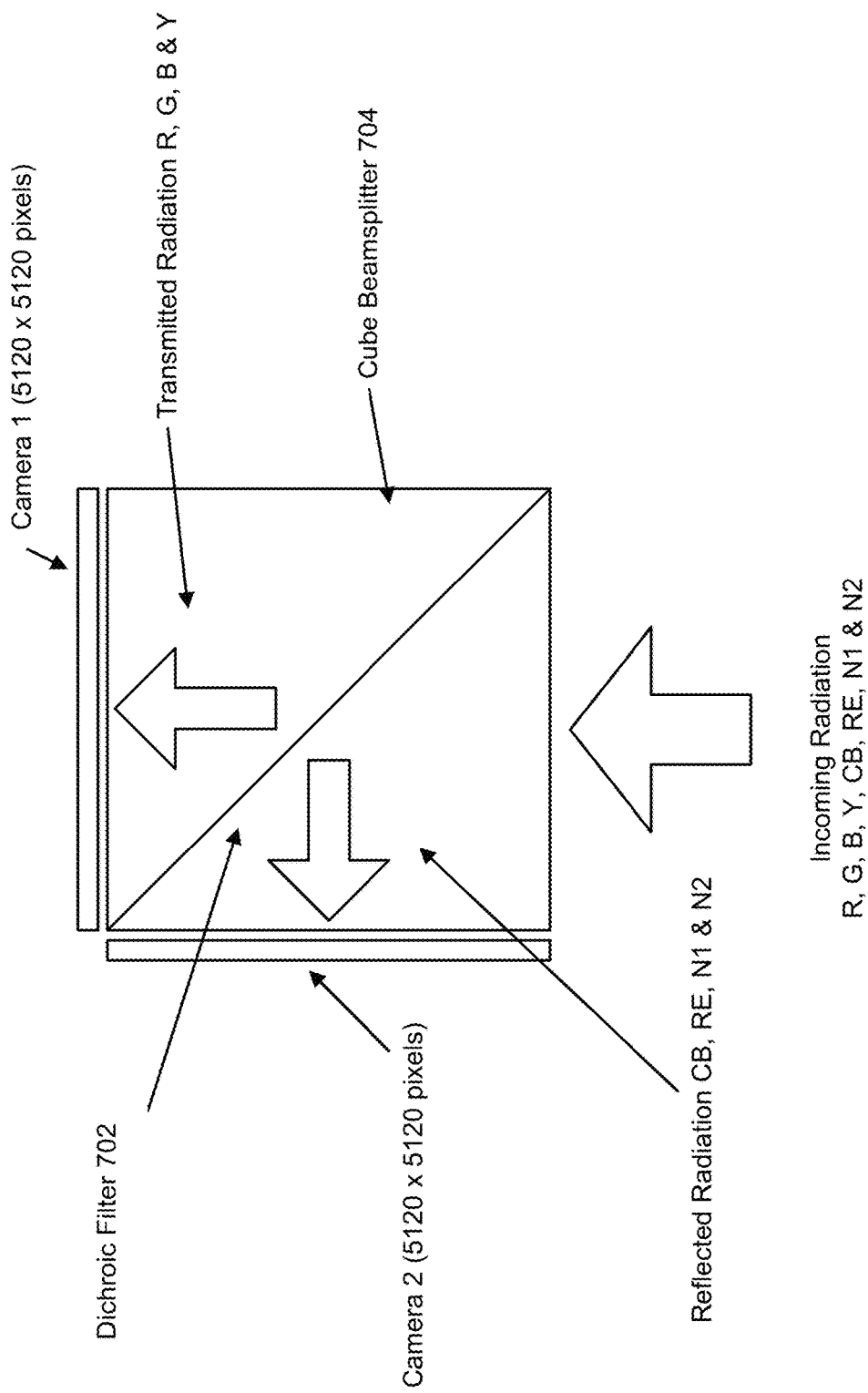
FIG. 7 is a schematic illustration of light paths of the imaging system of FIG. 6.

FIG. 7 is a schematic illustration of light paths of the imaging system of FIG. 6. FIG. 7 schematically illustrates the splitting of the incident light for the two cameras. The full spectrum incoming radiation is incident upon a cube beam splitter that includes a dichroic filter that separates out the visual portion of the spectrum (R, G, B, Y) from the wavelengths outside of the RGBY space (CB, RE, N1, N2). Other arrangements can be used, such as putting CB in the same sensing array as (G, B, Y) and putting red in with the longer wavelengths (RE, N1, N2). In FIG. 7 both cameras are shown to be of the same spatial (sampling) resolution, but, for example, it may be desirable for the camera for the visible range to have a relatively higher sampling resolution. Other wavelength ranges can similarly be incorporated by using corresponding array sensors; and more cameras can be incorporated by further splitting of the incoming radiation.

Figure 8:
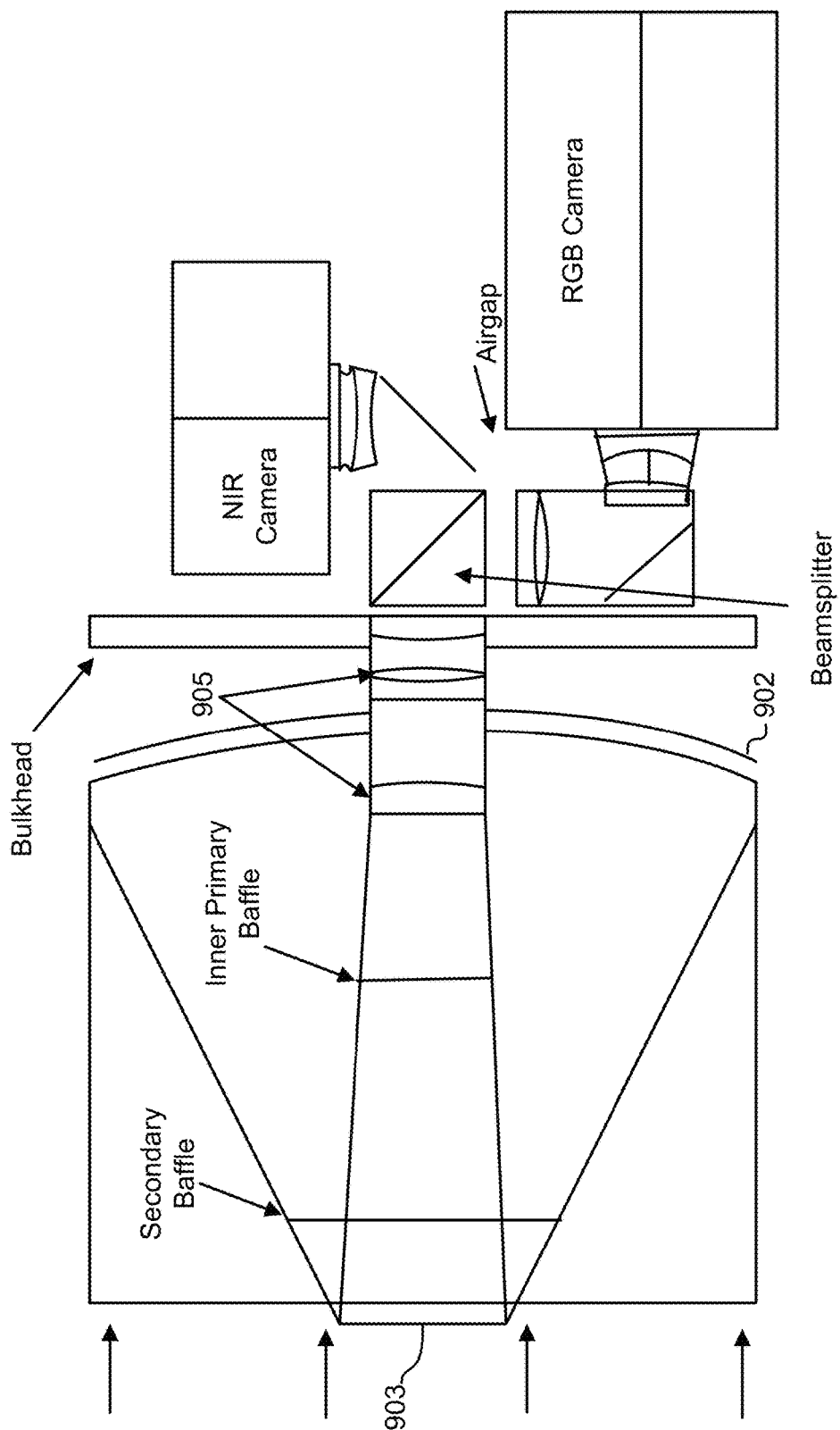
FIG. 8 is a top, cross-sectional view of components of the imaging system of FIG. 6.

FIG. 8 is a top, cross-sectional view of components of the imaging system of FIG. 6, including a primary reflector 902, a secondary reflector 903, and a set of lenses 905. An air gap might be provided so that vibrations, in orbit and/or during launch, do not easily transfer from the telescope section to the cameras.

Figure 9:
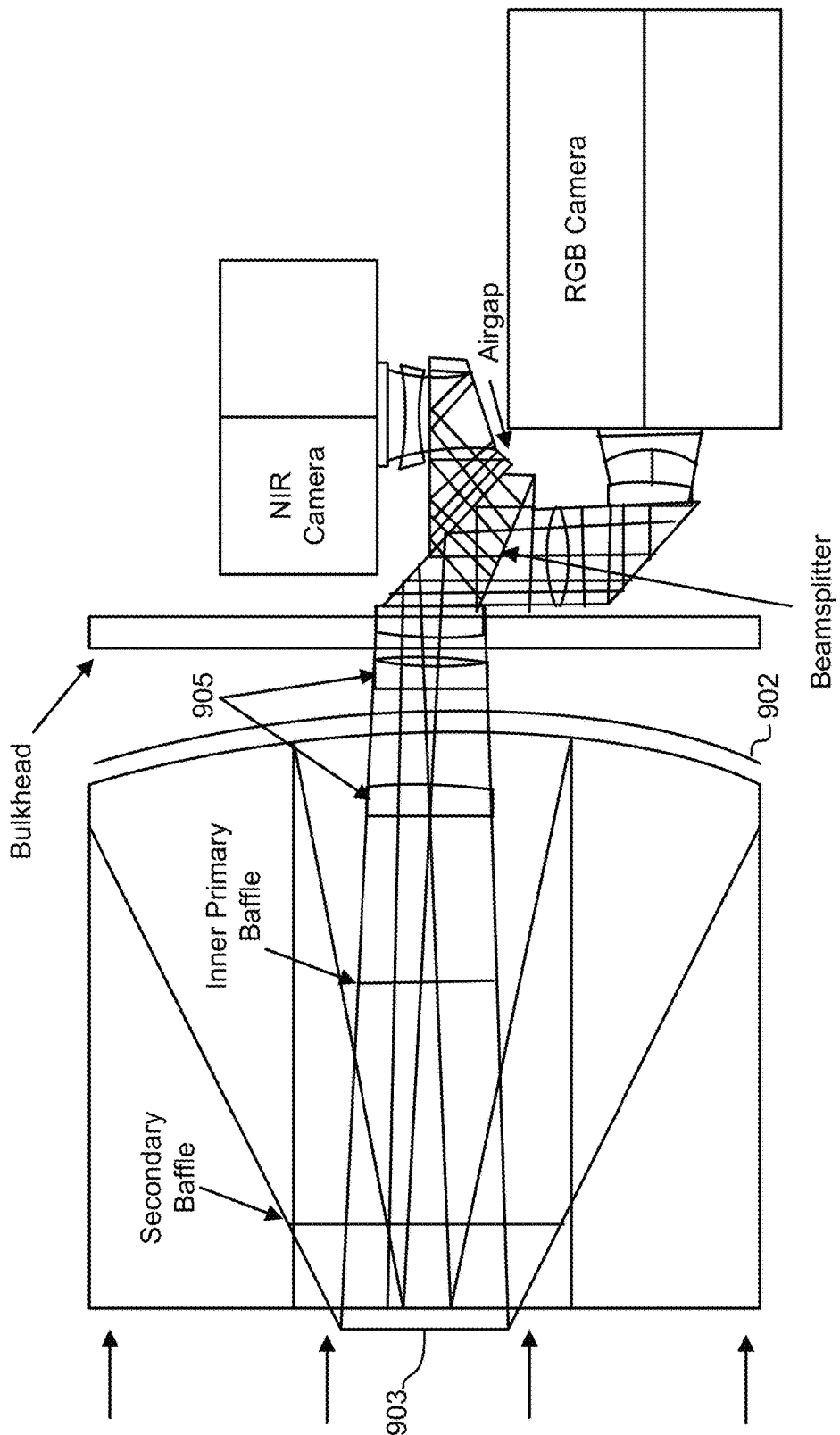
FIG. 9 is a top, cross-sectional view of components of the imaging system of FIG. 6, illustrating light paths.

FIG. 9 is a top, cross-sectional view of components of the imaging system of FIG. 6, illustrating light paths. The incoming light is incident on a primary reflector 902. For compactness in the telescope volume, the primary reflector 902 has increased hyperbolic curvature relative to most commercial telescopes. Primary reflector 902 reflects the incident light onto secondary reflector 903, also with increased curvature, which in turn reflects the light through the set of lenses 905 and on to the sensors, where the paths of a number of rays are shown. The inner primary baffle and secondary baffle are also designed to be square to minimize mass. The square shape of the secondary baffle also allows more light energy per unit time to arrive at the primary mirror than a traditional circular baffle would. The latter further enhances signal to noise ratio (SNR) of the telescope.

In the example here, the sensor array includes two separate cameras. After the lens, the optical path includes a dichroic splitter to separate out different wavelength ranges used by the sensor arrays after filtering of wavelengths by the Color Filter Arrays (CFAs) for two cameras, which in this example has one camera for the standard visible spectrum that uses an RGBY colorspace sensor array and another camera for wavelengths on either or both sides of the visible, such as bands known as Coastal Blue (near UV), Red Edge, and near infrared (NIR). More generally, other sensor arrays can be used, with sensitivity to bands well beyond those discussed here; and, more cameras with different filter and sensor arrays, or a single camera with a different filter and sensor array can be used after lenses 905.

The system can have the ability to modify the telescope field of view such that the beam splitter (or beams splitters) and multiple cameras can enable imaging of wider target areas. Here, the RGB camera has a sensor array sensitive to the visual spectrum and the second camera has a sensor array that is sensitive to wavelengths on one or both sides of the visual spectrum. The use of a dichroic beam splitter allows for each of the cameras to receive more or less all of the light of their respective wavelength ranges. Additionally, this helps to keep the undesired bands from leaking through color filter arrays (CFAs) on each sensor to some degree, providing better signal-to-noise results. The result is that a very high percentage of the light for each band reaches one camera or the other, and that the full sensitivity spectrum of the CMOS (or other type) sensors can be utilized. With the dichroic beam splitter and the addition of special mirror coatings, different sensors may be used at each camera location that have sensitivity in wavelengths beyond what CMOS silicon sensors can detect.

In the example of FIG. 6, the two optical subpaths from the beam splitter surface to each of the sensor arrays in cameras 606 and 608 are different lengths. In some preferred embodiments, the optical subpaths are the same length. As illustrated in FIG. 9, this may involve a set of mirrors and/or lenses to maintain compactness. When the subpaths are the same length, that may make image correction and coregistration easier and with the distortions due to other optical elements and features, the distortions are equalized. This can be important in applications where images from more than one camera are then recombined into a single image or data structure representing light capture for many different spectral wavelengths.

A number of variations and extensions of the arrangement shown in FIGS. 8 and 9 are possible. For example, one or more additional beam splitters can be added along with one or more additional cameras. For example, after the beam splitter, a second beam splitter can be added in path to one of the shown cameras to provide the incident light (or some range of it) to a third camera. This can be used to increase spatial (sampling) resolution, the wavelengths that are sensed (spectral resolution), or some combination of these. In other variations, the beam splitter (or one or more of multiple beam splitters) may be a whole-spectrum beam splitter, so that a panchromatic sensor can be used on one of the cameras to enhance the images on another camera that uses pixelated color filtered images.

Figure 10A:
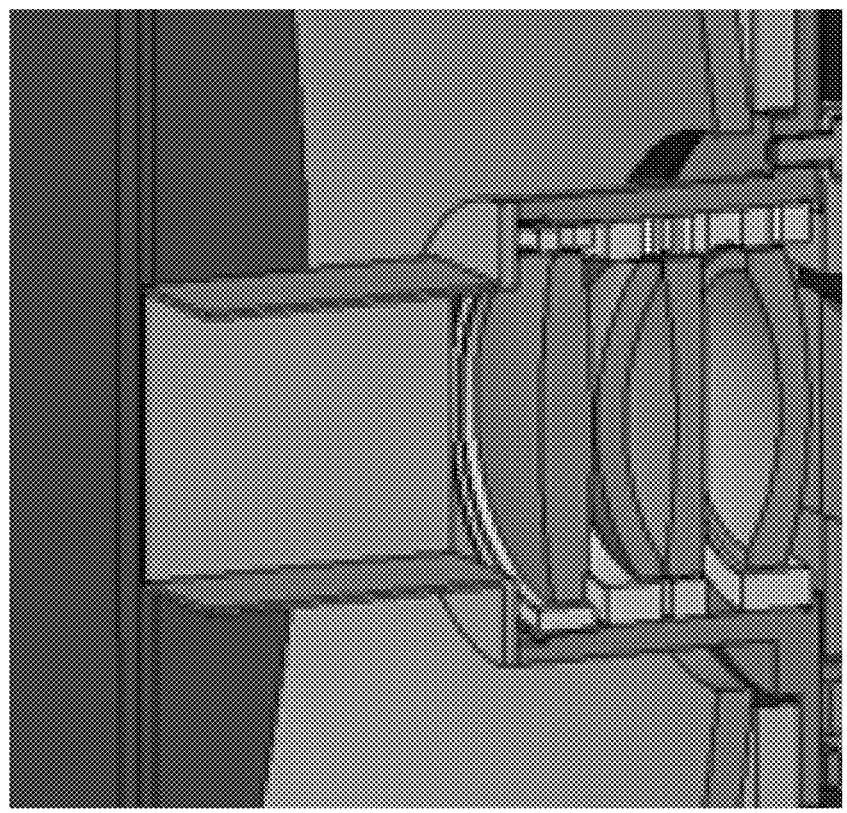
FIG. 10(A) is an angled view of an optical barrel section.
Figure 10B:
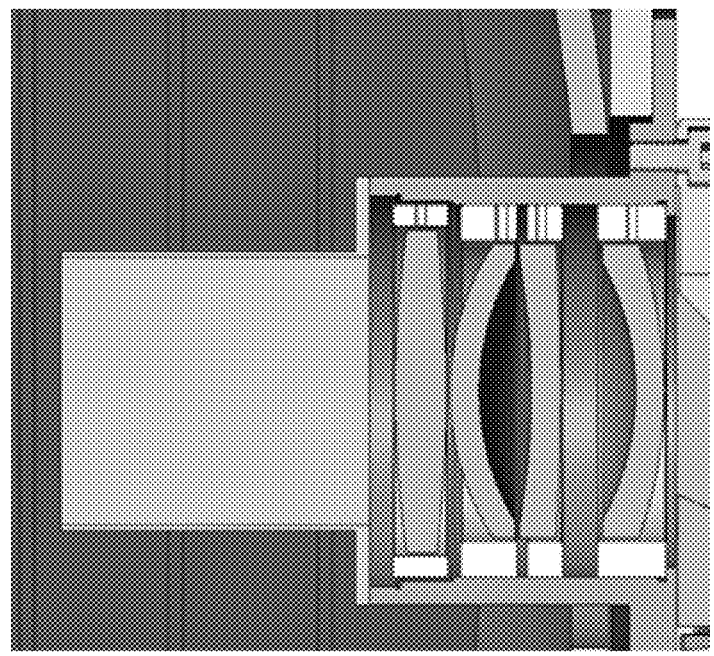
FIG. 10(B) is a straight-on side view of an optical barrel section.

FIG. 10 is a cut-away view of an optical barrel section; FIG. 10(a) is an angled view; FIG. 10(b) is a straight-on side view.

Figure 11:
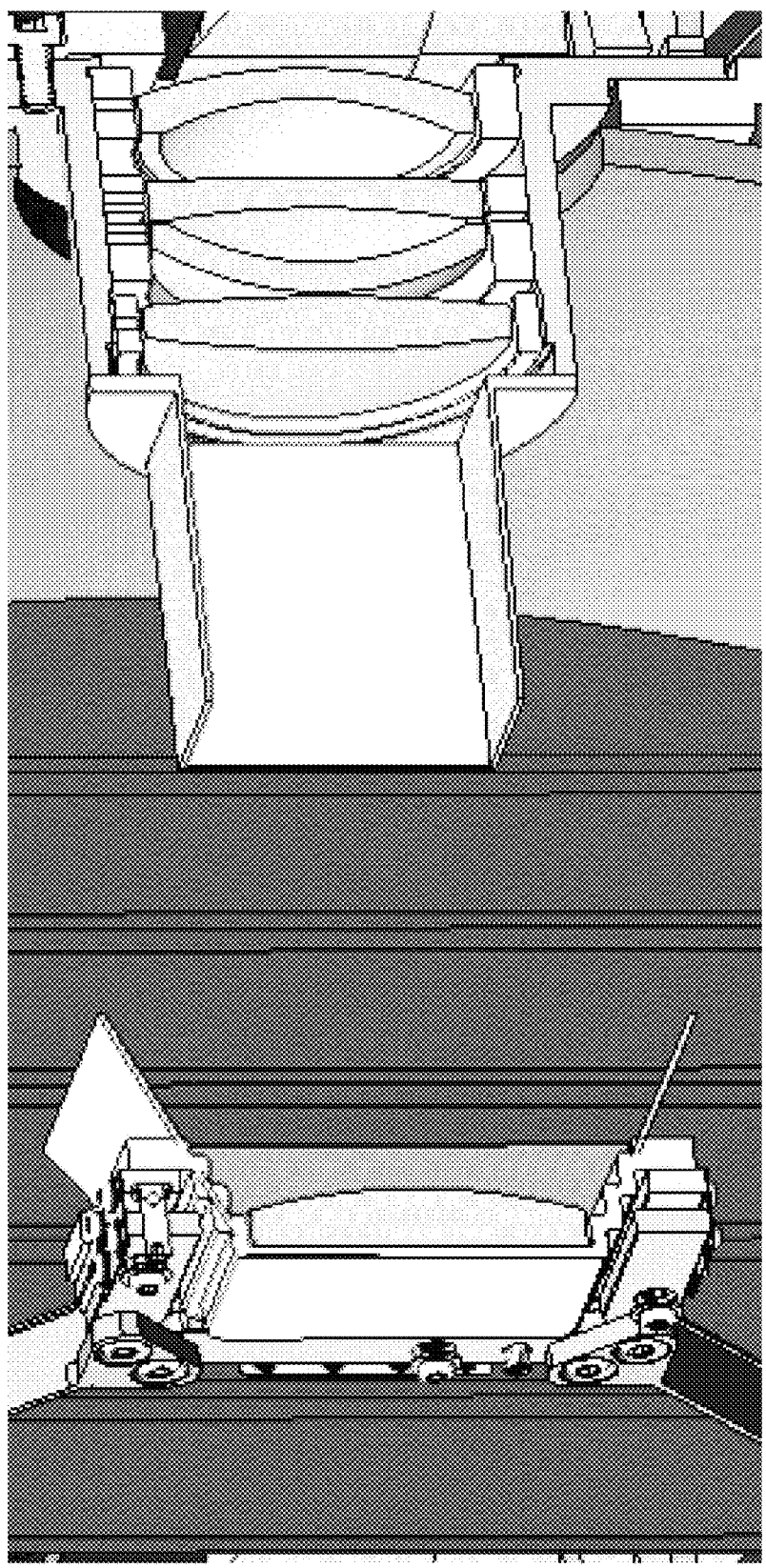
FIG. 11 is a cut-away view of a telescope section showing a square secondary mirror baffle and an optical barrel section.

FIG. 11 is a cut-away view of a telescope section showing a square secondary mirror baffle and an optical barrel section.

FIG. 12 illustrates one example of a correspondence between the two cameras and the wavelengths to which their sensor arrays respond. At the left of the figure, eight color bands and their corresponding wavelength ranges are listed. The array for the first camera is for the visual range using the RGBY (red, green, blue, yellow) colorspace. The second camera is sensitive to Coastal Blue (CB) with a wavelength below the visible and Red Edge (RE), Near Infrared 1 (N1) and Near Infrared 2 (N2) at wavelengths above the visible range.

Note that this multi-camera arrangement uses full-frame imaging cameras capable of using global-shutter-mode imaging. This allows the full array of all included wavelengths to be captured in images simultaneously. Consequently, the different images at different sensor locations do not suffer from the sort of time lags that can affect images when the different wavelengths or areas of the image are not captured at the same time, such as can occur when using a push broom scanner, or rolling-shutter imaging mode, for example, for obtaining the image data.

Post-capture processing registers the pixels from the different cameras and from the different color filters. This post-capture processing might be performed by processing circuitry (e.g., a processor, memory and program instructions) located at the camera, elsewhere in the satellite, or at a ground station. Registration is desirable when, for example, a single one-pixel wide white light source on Earth is being captured, effectively as a point source. In that case, the pixel arrays from the two cameras might show that point source in different locations in the pixel array due to the optics used, or due to the differences in capture rate or capture time between the cameras (a small asynchronicity in the capture times can result in a considerable image shift given the resolution and the velocity of the satellite). The processing might be based on pixelated color filtered image data. There might also be offsets in that a white light directed at a camera with a multi-color array can illuminate four adjacent pixels so that the four-color arrays for one camera would need to be realigned. The realignment process is simplified in the implementation example using full-frame imaging sensors that perform simultaneous imaging.

The accumulated pixel data can be combined on the satellite, sent back uncombined, or in some intermediate state. Although sending back all of the data requires more transmission time, this provides greater flexibility in that many additional combinations or views can be generated for different user needs. For example, one user may want relatively low resolution coastal blue data overlaid on an RGB image, while another may only be interested in red and longer wavelengths, but at the highest recorded resolution.

FIG. 13 illustrates examples of color filters used on pixel arrays. These filters would act on the incident light that has already been split by the beam splitter, as the filters would only see, for the most part, light in the spectra designated for that pixel array.

Figure 14:
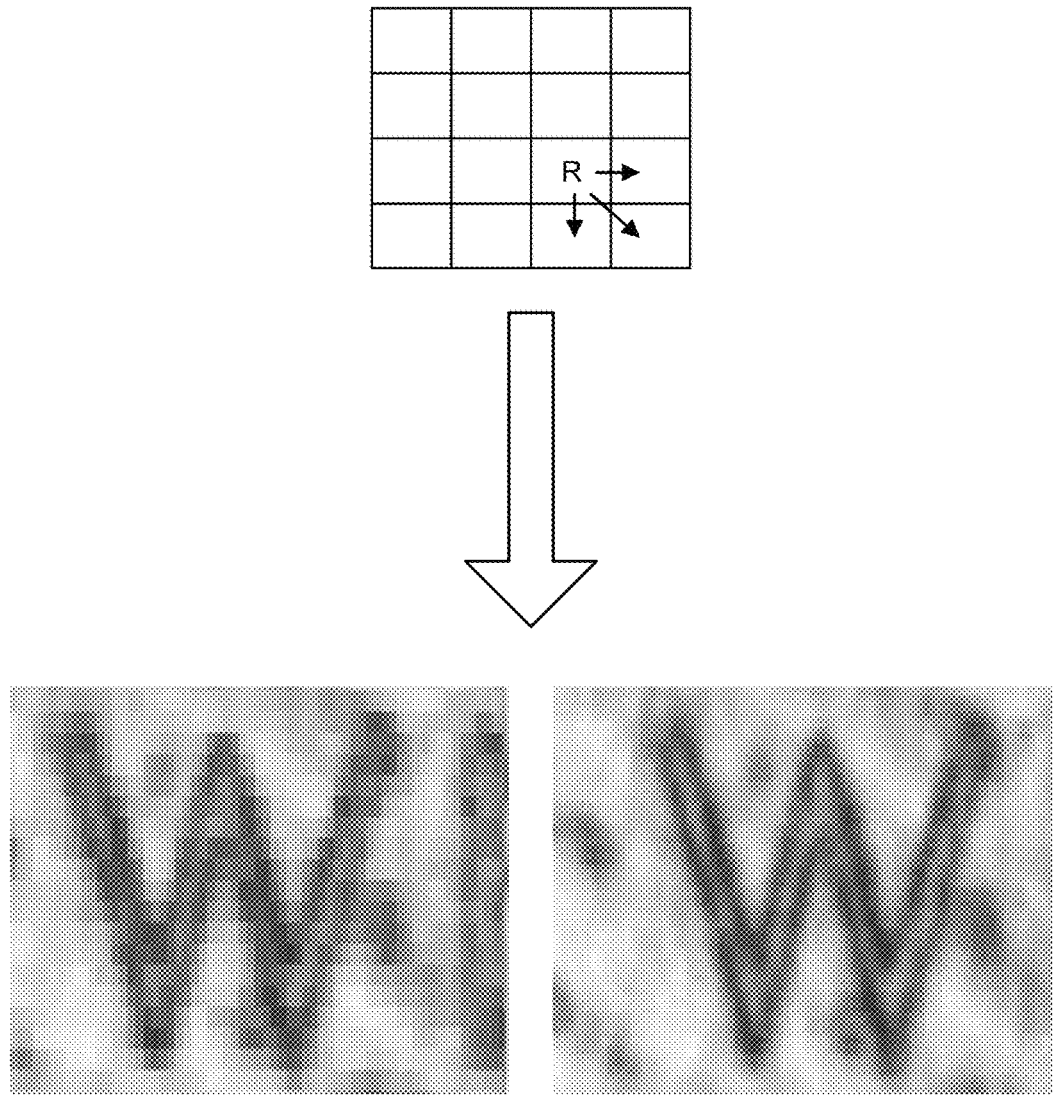
FIG. 14 illustrates an example of increased resolution from the use of subpixel shifting.

FIG. 14 illustrates an example of increased sampling resolution (derived from what is known as de-aliasing) from the use of subpixel shifting.

According to one embodiment, the techniques described herein are implemented by one or more generalized computing systems programmed to perform the techniques pursuant to program instructions in firmware, memory, other storage, or a combination. Although not shown, processing might be performed by a processor that accesses instructions in a program memory and controls communication and processing information. A processing system might include random access memory (RAM) or other dynamic storage device, or other intermediate information during execution of instructions to be executed by the processor. Such instructions, when stored in non-transitory storage media accessible to the processor, render the processing system into a special-purpose machine that is customized to perform the operations specified in the instructions. The processing system might also include a read only memory (ROM) or other static storage device for storing static information and instructions for the processor. The processing system may implement the techniques described herein using customized hard-wired logic, one or more ASICs or FPGAs, firmware and/or program logic which causes or programs the processing system to be a special-purpose machine. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics, including the wires that comprise a processor bus. Transmission media can also take the form of radio waves or light waves. Communication can be two-way data communication coupling to a ground station or another satellite.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A satellite imaging system, comprising:
   a telescope section arranged to receive incoming light along an optical path;
   a first camera having a first sensor array positioned in the optical path and sensitive to a first set of wavelength ranges comprising one or more wavelength ranges within a visible spectrum;
   a second camera having a second sensor array positioned in the optical path and sensitive to a second set of wavelength ranges comprising a plurality of wavelength ranges outside the visible spectrum, wherein the plurality of wavelength ranges outside the visible spectrum comprise a first wavelength range that is above 700 nanometers and a second wavelength range that is below 450 nanometers, and wherein the second sensor array is a sensor array sensitive both the first wavelength range and the second wavelength range; and
   a dichroic beam splitter in the optical path, whereby light in the first set of wavelength ranges is directed to the first camera and light in the second set of wavelength ranges is directed to the second camera.

2. The satellite imaging system of claim 1, wherein the dichroic, beam splitter is a whole-spectrum beam splitter, wherein the one of the first sensor array and the second sensor array is a panchromatic sensor array and the other of the first sensor array and the second sensor array is a non-panchromatic sensor array providing pixelated, color-filtered images, and wherein outputs of the panchromatic sensor array are usable to enhance the pixelated, color-filtered images.

3. The satellite imaging system of claim 2, further comprising processing circuitry for performing image enhancement.

4. The satellite imaging system of claim 1, further comprising electronic bandwidth controls for controlling and/or modifying a passband defined by the dichroic beam splitter whereby wavelengths of the first set of wavelength ranges and/or the second set of wavelength ranges can be controlled and/or modified.

5. The satellite imaging system of claim 1, further comprising:
   a third camera; and
   a second beam splitter in the optical path, whereby at least a portion of the incoming light is directed to the third camera.

6. The satellite imaging system of claim 1, further comprising electronic field of view controls for controlling and/or modifying a telescope field of view.

7. The satellite imaging system of claim 1, wherein the dichroic beam splitter is positioned in the optical path between a first group of lenses and a group of focusing lenses.

8. The satellite imaging system of claim 1, wherein the first sensor array and the second sensor array each have a same pixel spacing and wherein the first camera and the second camera share a lens reflective element that provides focus compensation for both the first sensor array and the second sensor array.

9. The satellite imaging system of claim 1, further comprising a prism onto which the dichroic beam splitter is applied.

10. The satellite imaging system of claim 1, wherein the first camera and the second camera have a common base spatial sampling resolution and the first camera has first commandable sampling resolution that is higher than a second commandable sampling resolution of the second camera.

11. The satellite imaging system of claim 1, further comprising a double-dichroic beam splitter, wherein the first camera has a first resolution that is higher than a second resolution of the second camera and wherein beams split by the dichroic beam splitter are aligned to allow for overlay of data from the first camera and data from the second camera.

* * * * *